United States Patent [19]

Sliwka

[11] 4,260,515

[45] Apr. 7, 1981

[54] PROCESS FOR HARDENING MICROCAPSULES

[75] Inventor: Wolfgang Sliwka, Weinheim, Fed. Rep. of Germany

[73] Assignee: BASF Aktiengesellschaft, Ludwigshafen, Fed. Rep. of Germany

[21] Appl. No.: 45,653

[22] Filed: Jun. 5, 1979

[30] Foreign Application Priority Data

Jul. 12, 1978 [DE] Fed. Rep. of Germany ....... 2830539

[51] Int. Cl.³ .............................................. B01J 13/02
[52] U.S. Cl. .................................. 252/316; 282/27.5; 427/340; 428/307; 428/914
[58] Field of Search ......................... 252/316; 427/340

[56] References Cited

U.S. PATENT DOCUMENTS

| 2,800,457 | 7/1957 | Green et al. | 252/316 |
| 2,800,458 | 7/1957 | Green | 252/316 |
| 2,886,445 | 5/1959 | Rosenthal et al. | 426/5 |
| 3,677,813 | 7/1972 | Eckert et al. | 428/473 |
| 3,778,383 | 12/1973 | Schibler et al. | 252/316 |
| 3,872,023 | 3/1975 | Baum et al. | 252/316 |

*Primary Examiner*—Richard D. Lovering
*Attorney, Agent, or Firm*—Oblon, Fisher, Spivak, McClelland & Maier

[57] ABSTRACT

A process for hardening microcapsules having walls of synthetic polymers containing groups reactive toward aldehyde groups, wherein hardening is effected by means of a methylolmelamine or an ether thereof at a slightly acidic to slightly alkaline pH.

Very impermeable microcapsules are obtained, which are suitable for the manufacture of colorless no-carbon papers.

8 Claims, No Drawings

PROCESS FOR HARDENING MICROCAPSULES

The present invention relates to a process for hardening microcapsules having walls of synthetic polymers, the wall material containing groups reactive toward aldehyde groups.

Depending on the nature of the substance to be encapsulated, on the nature of the wall material to be used, and also on the field of application, different processes are used to manufacture microcapsules or microcapsule dispersions. For example, to manufacture carbonless reactive copying papers, microcapsules containing colorless dye intermediates in an organic core fluid are used. If the face coated with the microcapsules (the donor face) is brought into contact with an acceptor face which is coated with electron acceptors (color developers), and the microcapsules are destroyed, for example by pressure, the dye intermediate is liberated at the point where pressure has been applied, and its reaction with the color developer produces a colored copy. The donor and the color developer (also referred to as acceptor) can also be applied to the same face, either as superposed layers or as a mixture, and furthermore the donor and/or acceptor can have been incorporated into the paper during its manufacture. In only the acceptor or only the donor is incorporated into the paper, the paper is coated with an acceptor or donor layer respectively. To avoid premature release of the capsule contents, resulting in smudging of the papers, the capsules must be impermeable to the capsule contents, the capsule wall must be sufficiently stable, and there must be no dye intermediate and solvent (where such is used) outside the capsules.

The capsules acquire their impermeability to the capsule contents especially by a treatment, for example a hardening of the capsule wall, during or after their manufacture. The hardener used reacts with reactive groups present in the wall material, causing crosslinking. Accordingly, the hardener used depends on the chemical structure of the reactive groups present in the wall material.

In the case of wall materials which can be hardened by means of aldehydes, formaldehyde and dialdehydes, for example glutarodialdehyde, are conventionally employed. These capsules are not entirely impermeable. Dye intermediate can be detected outside the capsules if the capsule dispersion is applied to an acceptor face and dried. In the case of capsules which are not entirely impermeable, slight discoloration of the paper, mostly in the form of spots, is discernible. If a drop of the solvent used to dissolve the dye intermediate is placed on the coating, a very much more intense discoloration of the latter results in most cases. This discoloration is evidently attributable to lack of impermeability and/or to dye intermediate present on the outside of the microcapsules, since this treatment with solvent does not result in opening, or destruction, of the capsules. This lack of impermeability of the capsules can, when the capsules are used in the production of a set comprising a form and copies thereof, in which set the donor layer containing the microcapsules rests directly on the acceptor layer, lead to unpleasant discoloration of the acceptor layer, especially on prolonged storage. Colorless self-contained papers cannot be produced with such microcapsules.

Using the test method described above, the microcapsules found to be not entirely impermeable are especially those which have been obtained by coacervation methods, for example the gelatin microcapsules obtainable by the process described in U.S. Pat. Nos. 2,800,457 and 2,800,458. More impermeable microcapsules are obtained by the process described in U.S. Pat. No. 3,872,023. However, even with these capsules the impermeability is not always sufficient to permit the manufacture of satisfactory twolayer papers.

It is an object of the present invention to provide a process for hardening (crosslinking) the wall material of microcapsules, which does not suffer from the disadvantages of hardening with formaldehyde and/or glutarodialdehyde or other dialdehydes and which gives substantially more impermeable microcapsules than do the conventional hardening processes.

We have found that this object is achieved and that microcapsules having walls of synthetic polymers, the wall material containing groups reactive toward aldehyde groups, can be hardened so as to avoid the disadvantages described if the hardening is effected in an aqueous medium at from 5° to 100° C. and at a pH of from 3 to 11 by means of a methylolmelamine which contains an average of from 2.5 to 6 methylol groups, a $C_1$-$C_4$-alkyl ether thereof, or mixtures of these, using at least 1.5 equivalents of methylol compound, methylolether compound or a mixture thereof per equivalent of reactive groups in the wall material.

The process according to the invention gives very impermeable microcapsules. Only very slight amounts of the material present as the core material in the capsules can be detected on the outside of the capsules. The microcapsules, containing dye intermediate, which have been hardened by the novel process are exceptionally suitable for the manufacture of self-contained papers.

The process according to the invention is carried out by adding the required amount of methylolmelamine and/or $C_1$-$C_4$-alkyl ether thereof, in several portions or continuously, to the microcapsule suspension or dispersion, the latter being obtainable in the conventional manner, for example by the phase separation process.

Suitable wall materials containing groups reactive toward aldehyde groups are in particular copolymers which contain acetylacetate groups. Such polymers can be obtained by copolymerization of, for example, $C_2$-$C_6$—alkylenediol monoacrylate (or monomethacrylate) acetylacetates, eg. ethylene glycol monoacrylate (or monomethacrylate) acetylacetate, propanediol monoacrylate (or monomethacrylate) acetylacetate, butanediol monoacrylate (or monomethacrylate) acetylacetate and hexanediol monoacrylate (or monomethacrylate) acetylacetate, of vinyl acetylacetate or of mixtures of these acetylacetates with other copolymerizable monomers. The copolymers used as the wall material can additionally contain, as copolymerized units, other comonomers bearing reactive groups, for example acrylamide, methacrylamide, N-methylolacrylamide ether and diacetoneacrylamide.

Other suitable copolymerizable monomers are especially esters of acrylic acid and methacrylic acid with $C_1$-$C_8$-alkanols, styrene, acrylonitrile and also acrylic acid, methacrylic acid, vinylsulfonic acid, salts of these acids or mixtures thereof.

The copolymers are prepared in the conventional manner, for example by free radical polymerization in dispersion or preferably in solution, for example in isopropanol.

Hardening, accompanied by crosslinking of the groups present in the wall material and capable of reacting with aldehydes, takes place even at temperatures as low as about 5° C. For reasons of stability of the microcapsules, the upper temperature limit is 95°–100° C. Preferably, hardening is carried out at from 40° to 90° C. The pH in the microcapsule dispersion/suspension is not critical. Advantageously, the hardening is carried out at a pH of from 3 to 11, preferably from 4 to 10, especially from about 4 to 7.

The hardener used is a methylolmelamine which contains an average of from 2.5 to 6 methylol groups. The $C_1$–$C_4$-alkyl ethers of these methylolmelamines, or mixtures of the ethers and methylolmelamines, can be used with equal success. Preferred ethers are the methyl ethers of the methylolmelamines.

Preferred hardeners are those which contain an average of from 2.5 to 6 methylol groups or methylol methyl ether groups per melamine molecule.

The amount of hardener used is at least 1.5 eqivalents of methylolmelamine and/or melamine methylol ether per equivalent of groups which react with aldehydes. Preferably, from 1.7 to 3 equivalents of methylol compounds or methylol-ether compounds are used per equivalent of reactive groups present in the wall material. It is also possible to use more than 3 equivalents of the said melamine derivatives, but this increased amount does not result in any advantage. As a rule, hardening is complete in from 1 to 6 hours.

The hardening (crosslinking) and hence the improvement in the impermeability of the microcapsules can be influenced both by the amount of hardener and by the number of methylol groups or methylol-ether groups in the melamine molecule. Melamine derivatives which contain an average of from 5 to 6 methylol (or methylol-ether) groups, when used in the same equivalent amounts, give a greater impermeability than melamine derivatives which contain an average of from 2.5 to 4 methylol (or methylol-ether) groups.

From the point of view of the hardening, the process by which the microcapsules have been produced is virtually immaterial. The decisive factor is that the wall material contains groups which react with the hardener under the stated conditions, resulting in crosslinking accompanied by hardening of the wall material.

For example, microcapsules of which the wall material is a synthetic polymer which is based on copolymers of acrylate esters and contains acetylacetate groups as reactive groups are hardened by reaction with at least 1.5, preferably with from 1.7 to 3 equivalents of methylol (or methylol-ether) compound per equivalent of acetylacetate group. This gives very impermeable microcapsules.

A wall material of the above type is described, for example, in U.S. Pat. No. 3,872,023.

The Examples which follow illustrate the process according to the invention. The percentages are by weight.

Since the measured properties "intensity of the copy" and "external dye intermediate," referred to in the Examples which follow, depend on the size of the microcapsules and hence also on the capsule size distribution, and since the determination of the capsule diameter under a microscope suffers from errors, the procedure followed in all the Examples was to use capsules from the same batch for all experiments. To do this, the batch was divided up after dispersion, so that the amounts shown in the Examples were distilled and hardened. In this way, the results obtained within the series of experiments are directly comparable, since the microcapsule sizes and size distribution remain the same.

EXAMPLE 1

(A) Preparation of the microcapsules (α) Preparation of the copolymers:

500 g of a solution which is obtained by mixing 697.5 g of methyl methacrylate, 570 g of propanediol monoacrylate acetylacetate, 225 g of acrylamide, 7.5 g of acrylic acid, 1,500 g of isopropanol and 7.5 g of azodiisobutyronitrile are heated to 80° C. 15 minutes after the polymerization has started, the addition of the remainder of the solution is commenced, and completed over 2 hours at 80°–85° C. The polymerization is then completed by heating for a further hour at 80° C. When the solution has cooled, it is brought to a 40% polymer content by adding 750 g of chloroform. The polymer has a K value of 34 (determined by the Fikentscher method) (on a 1% strength solution prepared by diluting the above solution with chloroform).

(β1) Preparation of the emulsion:

A solution of 3,780 g of water, 720 g of a 10% strength solution of polyvinylpyrrolidone (K value 90), 9.0 g of tributylamine and 8.28 g of p-toluenesulfonic acid is introduced into a vessel. A solution of 24 g of N-benzoyl-leuco-methylene blue and 72 g of crystal violet lactone in 366 g of hydrogenated terphenyl, 1,080 g of n-dodecylbenzene, 1,620 g of chloroform and 90 g of isopropanol is dispersed in the above aqueous solution with vigorous stirring by means of a high-speed stirrer running at 10,000 rpm. 1,080 g of the copolymer solution which has been obtained as described in (α) (containing 0.768 mole of propanediol monoacrylate acetylacetate) together with 1,800 g of chloroform are then added in the course of 20 minutes and the mixture is dispersed until the emulsified particles have a diameter of from 2 to 6 μm.

(β2) Preparation of the microcapsule dispersion, and hardening:

Portions of 1/6 of the emulsion obtained as described in (β1) (containing 0.128 mole of propanediol monoacrylate acetylacetate) are each added to 900 g of water in a distillation apparatus, with stirring. The mixture is heated; at 56° C. the greater part of the chloroform distils off, and thereafter the isopropanol distils off as the temperature rises to above 80° C. The pH of the resulting dispersion is 4.7.

The amounts of a trimethylolmelamine methyl ether (molar ratio melamine:formaldehyde=1:3) shown in Table 1 are then added uniformly in the course of one hour to the dispersions obtained above.

For comparison, formaldehyde is added to one dispersion. The dispersions are kept at 80° C. for 2 hours and then cooled. The capsules in the microcapsule dispersions obtained have a diameter of from 2 to 6 μm.

(B) Testing the microcapsules for impermeability, and intensity of the copy obtained.

The resulting milky-white microcapsule dispersions 1.1 to 1.6 (containing about 18% of microcapsules) were coated by means of a wire doctor (a) onto normal typewriting paper and (b) onto a sheet coated with an active clay (CF sheet) of a reactive copy paper and the papers were dried. The coating weight was 5 g of microcapsules per m² of paper surface.

The sheet coated as described in (a) is brought together with the coated side of a CF sheet, and the letter "W" is written over an area of size 5×5 cm by mens of an electric typewriter, using pressure setting 2, the letters being typed in immediate succession on each line and the lines being arranged with each close below the preceding line. The intensity of the copy, IC is measured, as the difference of the reflection of the CF sheet without writing and with writing, in a Zeiss reflectometer ($^{(R)}$ Elrepho) and is quoted in relative units, as a percentage (see Table 1).

The microcapsules coated onto the CF sheet as described in (b) give, after drying, a more or less faint coloration of the clay layer on the paper, caused by nonencapsulated dye intermediate. The dye intermediate located outside the microcapsules can be instantly converted, on the CF sheet, to the corresponding dye by spraying the capsule layer with dodecylbenzene and drying the material. The blue coloration of the CF sheets treated in this way was measured on a reflectometer, as described above, and is given as the relative intensity ICF, in percent.

TABLE 1

| Example | Hardening with trimethylol-melamine methyl ether+ | | Intensity of the copy IC (%) | Externally located dye intermediate ICF (%) | Ratio of equivalents of methylol compound to equivalents of cross-linkable groups |
|---|---|---|---|---|---|
| | g(70% = strength) | Equivalent | | | |
| 1.1 | 9 | 0.073 | 50 | 24 | 0.57 |
| 1.2 | 15 | 0.122 | 50 | 16 | 0.95 |
| 1.3 | 24 | 0.195 | 51 | 6 | 1.52 |
| 1.4 | 36 | 0.293 | 54 | 3 | 2.29 |
| 1.5 | 42 | 0.342 | 50 | 3 | 2.68 |

| (Comparison) | Formaldehyde++ | | Intensity of the copy IC (%) | Externally located dye intermediate ICF (%) | Ratio of equivalents of methylol compound to equivalents of cross-linkable groups |
|---|---|---|---|---|---|
| | g | Equivalent | | | |
| 1.6 | 7.8 | 0.52 | 46 | 21 | 4.06 |

$^{+}$1 equivalent = $\frac{258}{3}$ = 86 g $^{++}$1 equivalent = $\frac{30}{2}$ = 15 g

EXAMPLE 2

(A) Preparation of the microcapsules:

(α) The copolymer used as the wall material was prepared, in the form of a solution, from 637.75 g of methyl methacrylate, 630 g of butanediol monoacrylate acetylacetate, 225 g of acrylamide and 7.5 g of acrylic acid, as described in Example (1Aα).

(β1) Preparation of the emulsion:

A solution of 2,520 g of water, 480 g of a 10% strength polyvinylpyrrolidone solution (K value=90), 6.0 g of tributylamine and 5.52 g of p-toluenesulfonic acid is introduced into a vessel. A solution of 16 g of N-benzoyl-leuco-methylene blue and 48 g of crystal violet lactone in 244 g of hydrogenated terphenyl, 720 g of ndodecylbenzene, 1,080 g of chloroform and 60 g of isopropanol are dispersed in the preceding solution, and then 720 g of the copolymer solution obtained as described in (α) (containing 0.512 mole of butanediol monoacrylate acetylacetate) together with 1,200 g of chloroform are added in the course of 20 minutes. The mixture is dispersed until the emulsified particles have a size of from 3 to 6 μm.

(β2) Preparation of the microcapsule dispersion:

Portions of ¼ of the emulsion obtained as described in (β1) (containing 0.128 mole of butanediol monoacrylate acetylacetate) were freed from chloroform and isopropanol as described in Example (1Aβ2). The pH in the aqueous dispersion was 5.6.

The amounts of hexamethylolmelamine methyl ether shown in Table 2 were added, to the dispersions obtained, in the course of 30 minutes at 70° C. The dispersion was kept at 70° C. for 2 hours and then cooled.

The methylol compound was obtained by reacting melamine with formaldehyde (using 7 moles of formaldehyde per mole of melamine) and then etherifying the product with methanol. The capsule dispersion had a solids content of 16.5%. The capsule diameter was from 3 to 6 μm.

(B) The tests of the impermeability, and of the intensity of a copy, were carried out as described in Example (1B). The results are summarized in Table 2.

TABLE 2

| Ex. | Hexamethylol-melamine methyl ether | | Intensity of the copy IC (%) | Externally located dye intermediate ICF (%) | Ratio of equivalents of hardener to equivalents of crosslinkable groups |
|---|---|---|---|---|---|
| | g (70% strength) | Equivalent+ | | | |
| 2.1 | 9 | 0.0969 | 46 | 22 | 0.756 |
| 2.2 | 15 | 0.162 | 49 | 17 | 1.266 |
| 2.3 | 24 | 0.258 | 49 | 7 | 1.916 |
| 2.4 | 36 | 0.387 | 51 | 5 | 3.03 |

$^{+}$1 equivalent = $\frac{390}{6}$ = 65 g

EXAMPLE 3

(A) Preparation of the microcapsules:

(α) The copolymer from Example 2 was used as the wall material.

(β1) Preparation of the emulsion:

A solution of 3,150 g of water, 750 g of 10% strength polyvinylpyrrolidone solution (K value 90), 7.5 g of tributylamine and 6.9 of p-toluenesulfonic acid is introduced into a vessel. A solution of 20 g of N-benzoyl-leuco-methylene blue and 60 g of crystal violet lactone in 305 g of hydrogenated terphenyl, 900 g of ndodecylbenzene and 1,350 g of chloroform is dispersed in the preceding solution, with vigorous stirring (using a high-speed stirrer at 10,000 rpm). 900 g of the copolymer solution prepared as described in Example (2A) (containing 0.64 mole of butanediol monoacrylate acetylacetate) together with 1,500 g of chloroform are then added in the course of 20 minutes and the mixture is dispersed until the emulsifier particles have a diameter of 2-6 μm.

(β2) Preparation of the microcapsule dispersion:

Portions of 1/5 of the emulsion obtained as described in (β1) (containing 0.128 mole of butanediol monoacrylate acetylacetate) are each added to 900 g of water in a distillation apparatus, with stirring, and the chloroform and isopropanol are removed as described in Example (1Aβ2). Thereafter the amounts of hexamethylolmelamine methyl ether indicated in Table 3 are added to the microcapsule dispersions obtained, in the course of 30 minutes, and the mixture is kept at 90° C. for 2 hours.

For comparison, a batch was hardened with formaldehyde (for 2 hours at 90° C.).

The hardener was obtained by reacting melamine with formaldehyde (in the molar ratio of 1:9) and then etherifying the product with methanol.

(B) The tests of the impermeability, and of the intensity of a copy, were carried out as described in Example (1B). The results are summarized in Table 3.

TABLE 3

| Example | Hexamethylolmelamine methyl ether g (80% strength) | Equivalent+ | Intensity of the copy IC (%) | Externally located dye intermediate ICF (%) | Ratio of equivalents of hardener to equivalents of crosslinkable groups |
|---|---|---|---|---|---|
| 3.1 | 12 | 0.148 | 48 | 23 | 1.16 |
| 3.2 | 18 | 0.222 | 50 | 12 | 1.73 |
| 3.3 | 24 | 0.295 | 51 | 10 | 2.30 |
| 3.4 | 30 | 0.369 | 55 | 10 | 2.88 |

| (Comparison) | Formaldehyde++ | Intensity of the copy IC (%) | Externally located dye intermediate ICF (%) | Ratio of equivalents of hardener to equivalents of crosslinkable groups |
|---|---|---|---|---|
| 3.5 | 7.8 | 0.52 | 50 | 30 | 4.06 |

+ 1 equivalent = $\frac{390}{6}$ = 65 g

++ 1 equivalent = $\frac{30}{2}$ = 15 g

EXAMPLE 4

(A) Preparation of the microcapsules:

(α) The polymer from Example 1 was used in the form of the solution obtained as described in (Aα).

(β1) The emulsion was prepared as described in Example (1Aβ1) but only ⅓ of the stated amounts was used.

(β2) Half of the emulsion obtained as described in (β1) was converted to the dispersion as described in Example (1Aβ2). For hardening, the amounts of hardener shown in Table 4 were added to the dispersion in the course of one hour and the pH in the dispersion was then immediately brought to 9.3 by adding sodium hydroxide solution. The dispersion was kept at 80° C. for 1 hour and was then cooled.

The microcapsule dispersion contains capsules having a diameter of from 3 to 6 μm.

For comparison, a batch was hardened with formaldehyde under the same conditions.

(B) The tests of the intensity of a copy, and of the impermeability of the capsules, were carried out as described in Example (1B). The results are summarized in Table 4.

TABLE 4

| Example | Trimethylolmelamine methyl ether g (70% strength) | Equivalent+ | Intensity of the copy IC (%) | Externally located dye intermediate IFC (%) | Ratio of equivalents of hardener to equivalents of crosslinkable groups |
|---|---|---|---|---|---|
| 4.1 | 37.5 | 0.305 | 55 | 10 | 2.38 |

| (Comparison) | Formaldehyde++ | Intensity of the copy IC (%) | Externally located dye intermediate IFC (%) | Ratio of equivalents of hardener to equivalents of crosslinkable groups |
|---|---|---|---|---|
| 4.2 | 7.8 | 0.52 | 50 | 18 | 4.06 |

+ 1 equivalent = $\frac{258}{3}$ = 86 g

++ 1 equivalent = $\frac{30}{2}$ = 15 g

I claim:

1. A process for hardening microcapsules having walls of synthetic polymers containing acetylacetate groups reactive toward aldehyde groups, comprising: hardening said microcapsules in an aqueous medium at a temperature from 5° to 100° C. and at a pH of from 3 to 11 by means of an N-methylolmelamine which contains an average of from 2.5 to 6 methylol groups, a $C_1$–$C_4$ alkyl ether thereof, or mixtures thereof, wherein at least 1.5 equivalents of said methylol compound, said methylol-ether compound or said mixture thereof are reacted per equivalent of reactive groups in the wall material.

2. The process as claimed in claim 1, wherein hardening is effected with from 1.7 to 3 equivalents of methylol compound, methylol-ether compound or a mixture thereof per equivalent of reactive groups in the wall material.

3. The process as claimed in claim 1 or 2, wherein hardening is effected at a pH of from 4 to 10.

4. The process as claimed in claim 1 or 2, wherein hardening is effected at from 40° to 90° C.

5. The process as claimed in claim 3, wherein hardening is effected at from 40° to 90° C.

6. The process as claimed in claim 1 or 2, wherein hardening is effected at a pH of from 4 to 7.

7. A process for hardening microcapsules having walls of synthetic polymers containing acetylacetate groups reactive toward aldehyde groups, comprising: hardening said microcapsules in an aqueous medium at a temperature from 5° to 100° C. and at a pH of from 4 to 10 with an N-methylol melamine containing an average of from 2.5 to 6 N-methylol groups, $C_1$–$C_4$ alkyl ethers thereof or mixtures thereof, wherein from 1.7 to 3 equivalents of said methylol compound, said methylol-ether compound or said mixture thereof are reacted per equivalent of reactive groups in the wall material.

8. The process as claimed in claim 7, wherein hardening is effected at a pH of from 4 to 7.

* * * * *